(12) United States Patent
Hanson et al.

(10) Patent No.: US 7,565,033 B2
(45) Date of Patent: Jul. 21, 2009

(54) APPARATUS AND METHOD FOR INCREASING READOUT SPEED OF A SOLID STATE IMAGER

(75) Inventors: Eric Hanson, Tuxedo, NY (US); Alexander Krymski, La Crescenta, CA (US); Konstantin Postnikov, Pearlblossom, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 723 days.

(21) Appl. No.: 10/219,771

(22) Filed: Aug. 16, 2002

(65) Prior Publication Data

US 2003/0043089 A1 Mar. 6, 2003

Related U.S. Application Data

(60) Provisional application No. 60/313,117, filed on Aug. 17, 2001.

(51) Int. Cl.
*G06K 9/54* (2006.01)
*H04N 3/14* (2006.01)
(52) U.S. Cl. .................................. 382/304; 348/308
(58) Field of Classification Search ................ 382/280; 348/308, 282
See application file for complete search history.

(56) References Cited

U.S. PATENT DOCUMENTS

| | | | | | |
|---|---|---|---|---|---|
| 4,453,177 | A | * | 6/1984 | Berger et al. | 348/282 |
| 5,229,962 | A | * | 7/1993 | Yuh et al. | 365/162 |
| 6,115,065 | A | | 9/2000 | Yadid-Pecht et al. | |
| 6,466,265 | B1 | * | 10/2002 | Lee et al. | 348/308 |
| 6,784,928 | B1 | | 8/2004 | Sakurai et al. | |

FOREIGN PATENT DOCUMENTS

EP 0296886 12/1988

(Continued)

OTHER PUBLICATIONS

Computer Translated of Japanese Patent No. JP2001-024954 to Mizuno et al. (Inventors) and Hamamatsu Photonics KK (Assignee), Published on Jan. 26, 2001.*

(Continued)

*Primary Examiner*—Duy M Dang
(74) *Attorney, Agent, or Firm*—Dickstein Shapiro LLP

(57) ABSTRACT

An imaging system features high speed digitization of pixel signals by utilizing top and bottom digitization circuits which pipeline sample-and-hold operations with analog-to-digital conversion. In operation, while one digitization circuit is performing a sample-and-hold operation, the other digitization circuit is performing analog-to-digital conversion. The speed of the imaging system may be further increased by pipelining and interleaving operations within the top and bottom digitization circuits by using additional sets of sample-and-hold circuits and analog-to-digital converters.

24 Claims, 9 Drawing Sheets

FOREIGN PATENT DOCUMENTS

| | | |
|---|---|---|
| JP | 62-154981 | 7/1987 |
| JP | 2-268083 | 11/1990 |
| JP | 5-48460 | 2/1993 |
| JP | 9-238286 | 9/1997 |
| JP | 10-224697 | 8/1998 |
| JP | 11-191891 | 7/1999 |
| JP | 2000-324404 | 11/2000 |
| JP | 2001-16502 | 1/2001 |
| JP | 2001-024181 | 1/2001 |
| JP | 2001 024954 | 1/2001 |
| JP | 2001-24954 | 1/2001 |
| JP | 2001-45378 | 2/2001 |

OTHER PUBLICATIONS

Krymski et al., "A High Speed, 500 Frames/S, 1024×1024 CMOS Active Pixel Sensor", 1999 Symposium on VLSI Circuits, Digest of Technical Papers, pp. 137-138.

Torelli et al., "Analog-to-Digital Conversion Architectures for Intelligent Optical Sensor Arrays", SPIE vol. 2950, pp. 254-264, Pub. 1996.

\* cited by examiner

APPARATUS AND METHOD FOR INCREASING READOUT SPEED OF A SOLID STATE IMAGER

This application claims benefit of U.S. Provisional Application No. 60/313,117 filed Aug. 17, 2001, the content of which is incorporated herein in its entirety by reference.

FIELD OF INVENTION

The present invention relates to imaging systems. More specifically, the present invention is related to an architecture for high speed analog to digital conversion for an imaging system.

BACKGROUND OF THE INVENTION

FIG. 1 is an illustration of a CMOS active pixel sensor (APS) imaging system 100. The system 100 includes a pixel array 110, shown in FIG. 3 as including a row decoder 112 and a plurality of pixels P arranged into an array 111 having N rows and M columns. If system 100 is a color system, the pixels P would be made sensitive to the primary colors of red, green, or blue, and would typically be arranged in a Bayer pattern in which alternating rows are comprised of alternating green and red pixels and alternating blue and green pixels, respectively.

FIG. 2 illustrates one exemplary architecture for a pixel P. The pixel P includes a photosensitive element, such as photodiode 210, which converts optical energy into an electrical signal. The photodiode 210 is coupled to node-A, which is also coupled to a source/drain terminal of transistor 220. The transistor 220 has another source/drain terminal coupled to a Vdd potential source and a gate coupled to receive a read signal. Node-A is coupled to the gate of a source following transistor 230, which has one source/drain terminal coupled to the Vdd potential source and another source/drain terminal coupled to a source/drain terminal of a row transistor 240. The row transistor 240 has its gate coupled to a ROW control signal, and its other source/drain terminal coupled to an output line 250 at node-B.

The pixel P produces a voltage at node-A related to the brightness of the light sensed by the photosensitive element 210. The voltage at node-A controls the output at node-B by controlling the gate of the source following transistor 230. A row transistor 240 controls, via the ROW signal on line 260, whether the output of the source follower transistor 230 is coupled to the output line 250 at node-B. The output line 250 is also coupled to other pixels P in the array 110 having the same column position but in different rows of the array. It should be noted that the illustrated pixel P is only one exemplary architecture of a pixel. As is well known, there are several different architectures suitable for pixels, including those which utilize, for example, reset transistors and output a differential signal comprising a photo signal component and a reset signal component.

Referring back to FIG. 1, the electrical signal output by the pixel P are analog signals. These signals are subsequently processed and digitized by either analog processing and digitization circuit (bottom) 120b or analog processing and digitization circuit (top) 120t. The circuits 120b, 120t convert the analog signal into an equivalent digital signal and conveys the digital signal, via data bus 181, to a digital processing and storage system 130, for further processing in the digital domain (e.g., color interpolation) and storage. A control circuit 140 coordinates the activities of the pixel array 110, analog processing and digitization systems 120b, 120t, and digital processing and storage system 140 via control bus 182.

FIG. 3 is a more detailed diagram of the pixel array 110 and the analog processing and digitization systems 120b, 120t. The pixel array 110 includes an array 111 of pixels P and a row decoder 112. The row decoder 112 receives a row address from, for example, control circuit 140 on signal line 113. The row decoder 112 decodes the row address and activates one row of the array 111 by driving one of the signal lines 260 to a high logic state while maintaining the other signal lines 260 at a low logical state.

Each analog processing and digitizing circuit 120b, 120t is contain a plurality of sample-and-hold circuits 121 and an analog-to-digital converters 123. The sample-and-hold circuits 121 are each coupled to a respective column output line 250 of the pixel array. More specifically, the sample-and-hold circuits 121 in the bottom circuit 120b are coupled, via lines 250, to odd numbered columns while the sample-and-hold circuits 121 in the top circuit 120t are coupled, via lines 250, to even numbered columns. Each sample-and-hold circuit 121 is also coupled to signal line 122b (for bottom circuit 120b) or 122t (for top circuit 120t) for receiving control signals SHEb and SHEt, respectively.

The state of control signal SHEb and SHEt determines when the sample-and-hold circuits 121 sample and hold their input signals.

Each sample-and-hold circuit 121 is associated with a corresponding analog-to-digital converter 123. Each analog-to-digital converter 123 accepts as its input, the signal output by a respective sample-and-hold circuit 121. Each analog-to-digital converter 123 accepts, on signal line 124b (for bottom circuit 120b) or signal line 124t (for top circuit 120t), control signals ADEb, ADEt, respectively, for determining when to perform the analog to digital conversion.

Now also referring to FIG. 4, the operation of the pixel array 110 and the top and bottom analog processing and digitizing circuits 120b, 120t can be explained. The process begins when the row decoder 111 decodes a row address previously supplied on signal line 112 by setting one of the signal lines 260 to a high logical state and setting the other signal lines 260 to a low logical state. This is reflected in FIG. 4 by the ROW signal going high for "row i." As previously explained with respect to FIG. 2, enabling the ROW signal also causes the output of the pixel P to be coupled to output lines 250. Thus, pixels P corresponding to odd numbered columns in row i have their outputs coupled to corresponding sample-and-hold circuit 121 (at bottom circuit 120b), while pixels P corresponding to even numbered columns in row i have their outputs coupled to corresponding sample-and-hold circuits 121 (at top circuit 120t).

The top 120t and bottom 120b circuits cooperate and simultaneously process a single row. The signals SHEb and SHEt, which were low, go high simultaneously with the ROW signal going high. This enables the sample-and-hold circuits 121 in the bottom and top circuits 120b to sample-and-hold their corresponding pixels signals.

The signals SHEb and SHEt then are brought low. At this point the sample-and-hold circuits have buffered the pixel output and make available the buffered signal to the analog-to-digital converters 124.

Shortly thereafter, the ADEb and ADEt signals, which were low, go high. This enables the analog-to-digital converters 124 in the bottom and top circuits 120b, 120t. The buffered signals in the sample-and-hold circuits 121 for both odd and even pixels are converted into a digital signal. The ADEb and ADEt signals then go back low.

As the digital data is made available to the digital processing and storage system 130 (signified on FIG. 4 by the "row i" on signal line DATA), the process repeats with the next row in the array (i.e., row i+1) as indicated by the ROW signal going high for row i+1. This process is repeated until each row in the array has been thus processed. At this point, each pixel P in the array 110 has been processed and the process may be repeated for another image frame.

The above described apparatus and method therefore provides for a high speed mechanism for converting the analog signal output by each pixel P in the array 110 into a digital signal, where it can be digitally processed and stored by the digital processing and storage system 130. However, some applications, such as high speed photography, slow motion filming, or even information retrieval from a holographic memory system require faster pixel digitization. Accordingly, there is a need and desire for high speed architecture for performing digitization in an imaging system.

SUMMARY OF THE INVENTION

The present invention is directed to a high speed architecture for performing digitization in an imaging system. In a system of the present invention, the pixel array is associated with a top and bottom analog processing and digitization circuits. The top and bottom circuits are each coupled to both even and odd pixels. Thus, instead of dividing the sample-and-hold and digitizing processing along odd and even pixels of the same row, in the present invention, the top and bottom sections each work on different rows of the pixel array, in a pipelined manner.

The foregoing and other advantages and features of the invention will become more apparent from the detailed description of exemplary embodiments of the invention given below with reference to the accompanying drawings.

DETAILED DESCRIPTION OF THE INVENTION

Figure 1:
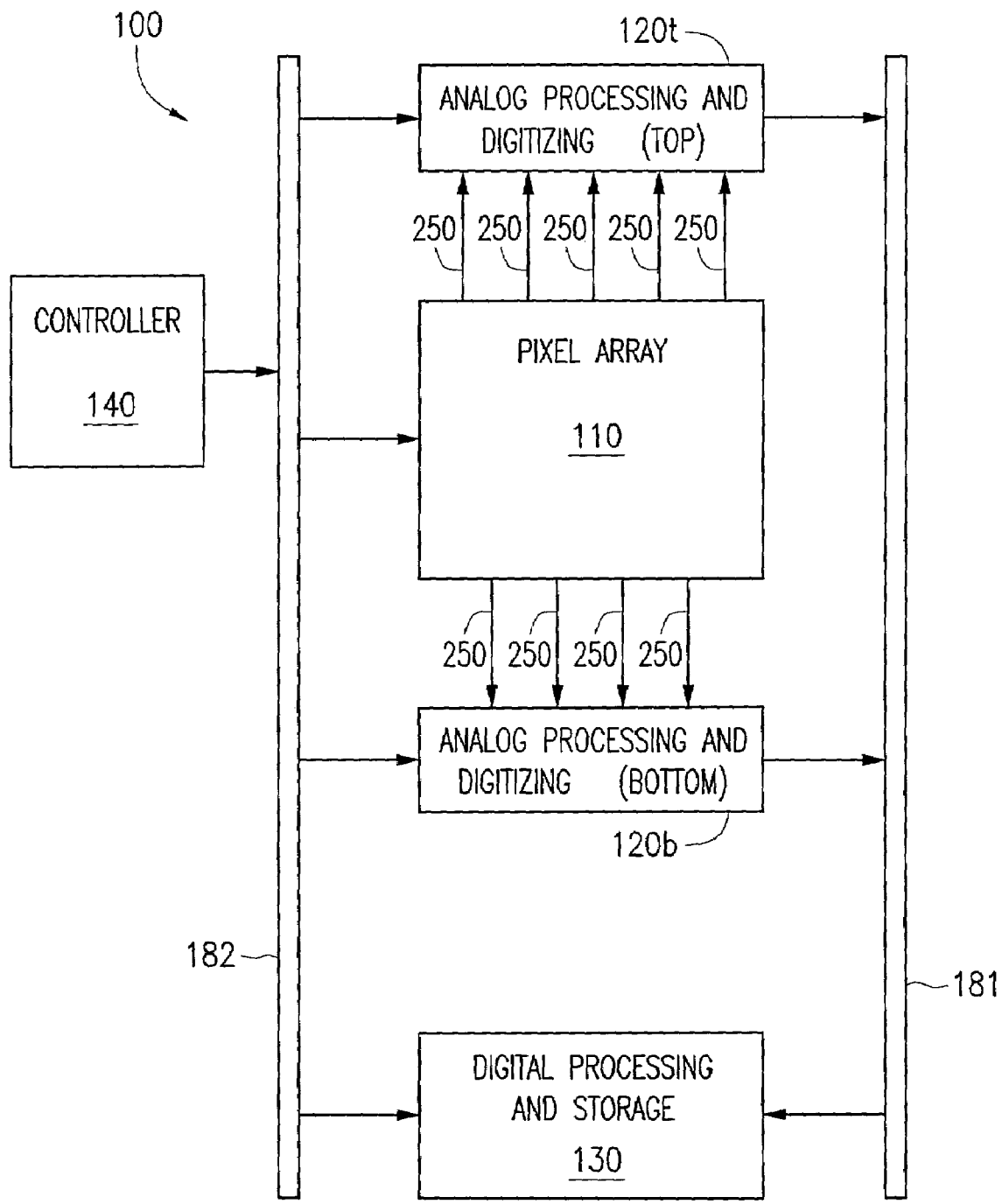
FIG. 1 is a block diagram of a prior art image processing system.
Figure 2:
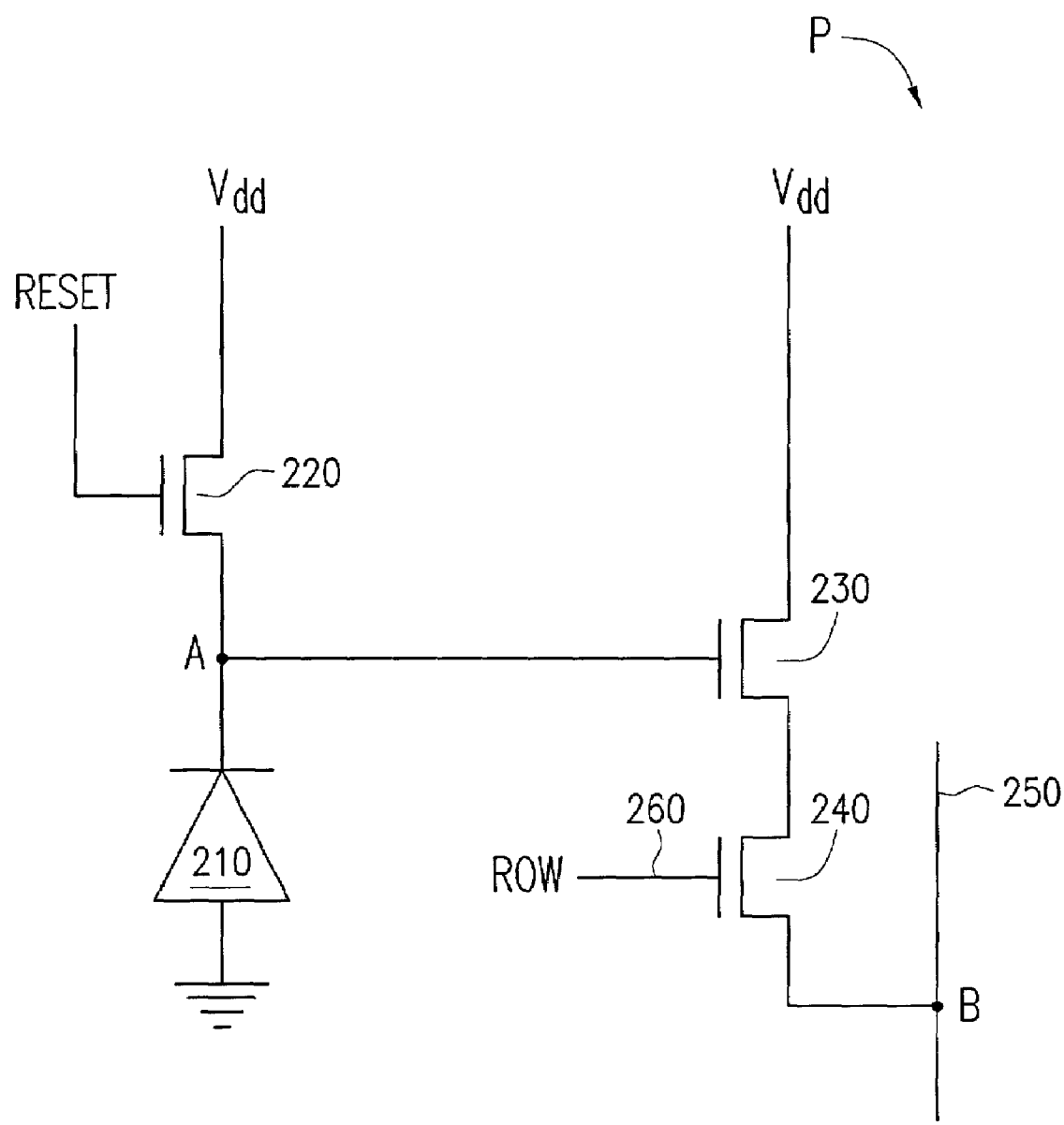
FIG. 2 is a block diagram of a prior art pixel for using in the image processing system.
Figure 3:
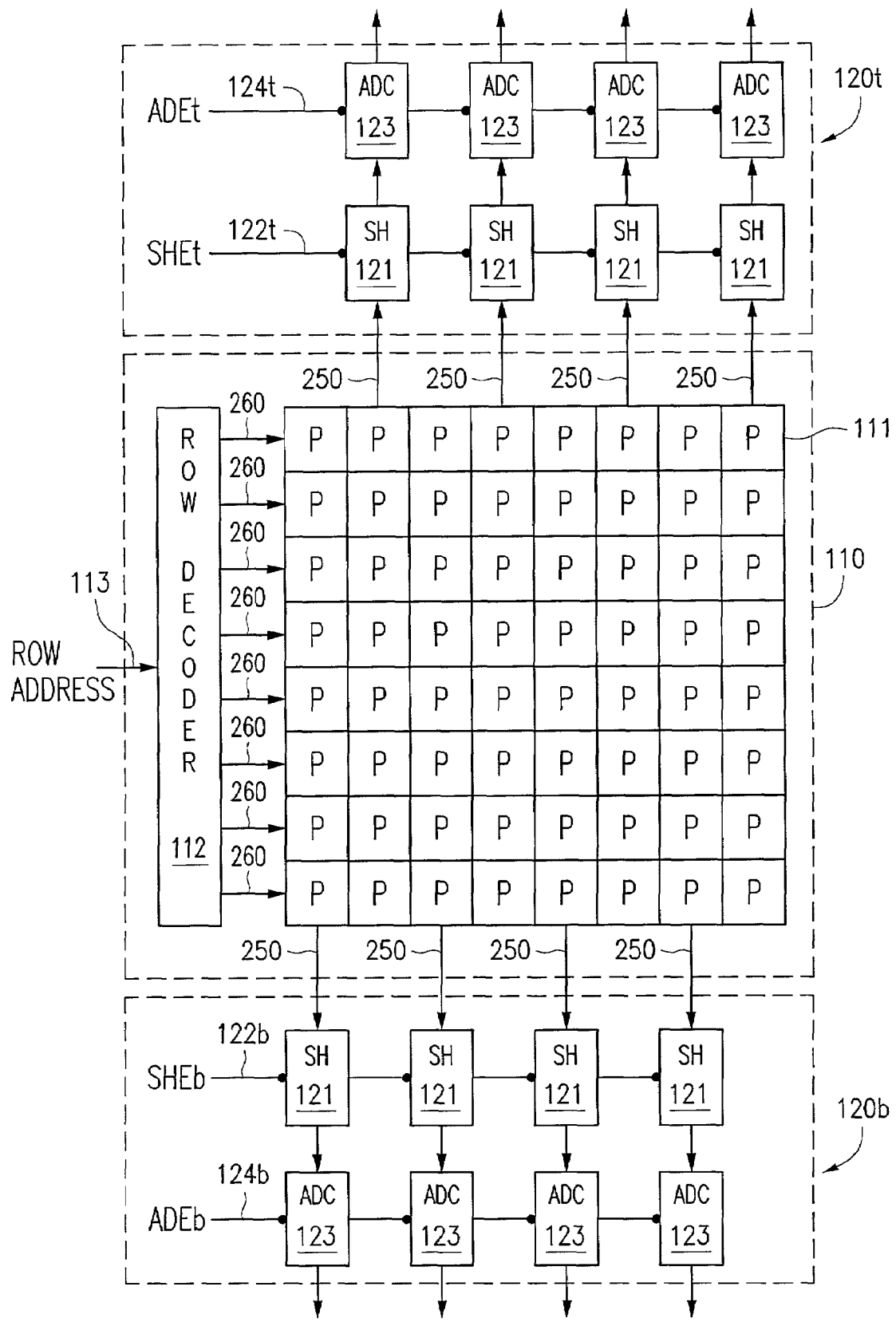
FIG. 3 is a detailed block diagram of the pixel array and the bottom and top sections of the analog processing and digitization system.
Figure 4:
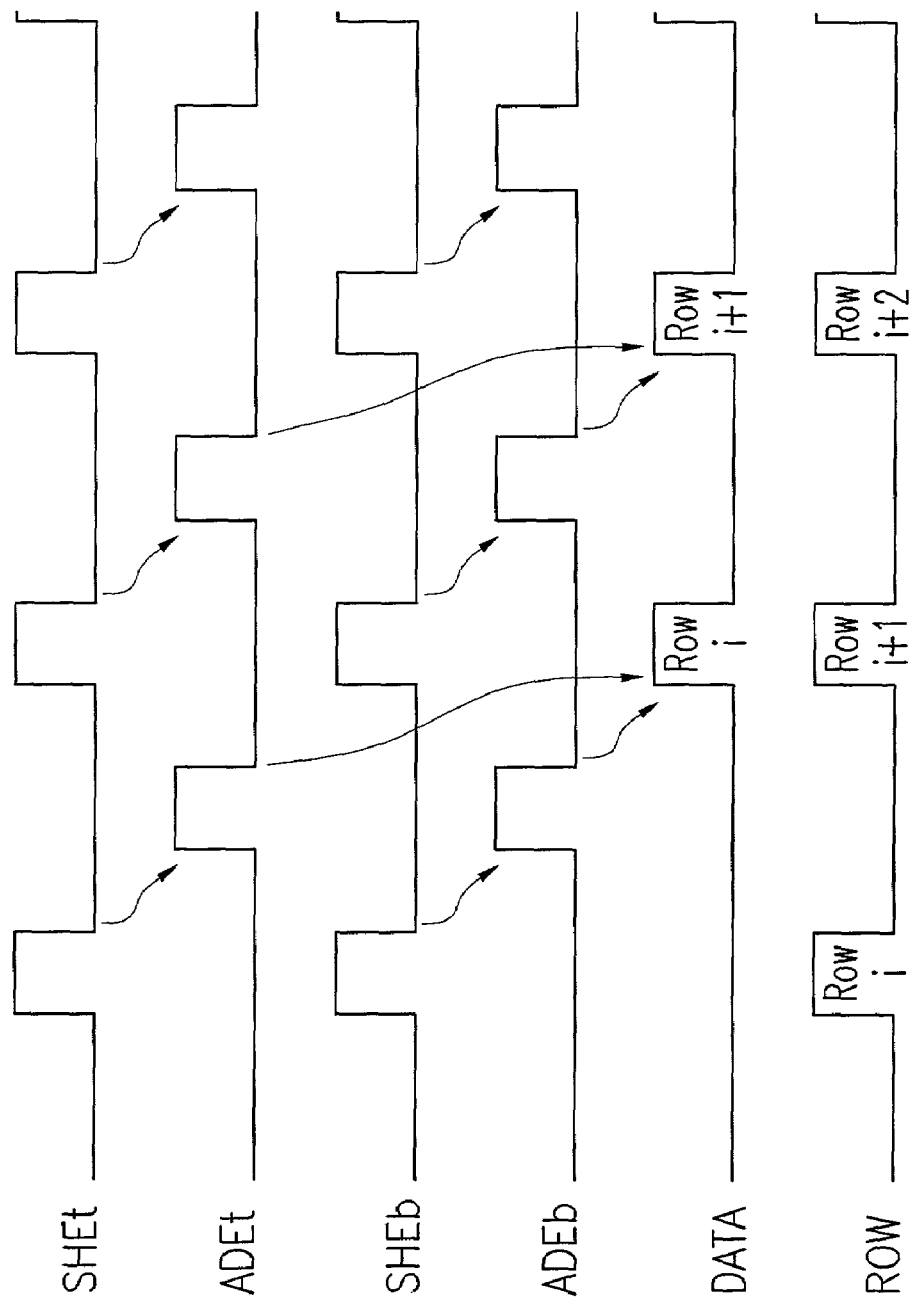
FIG. 4 is a timing diagram showing the operation of the apparatus illustrated in FIG. 3.
Figure 5:
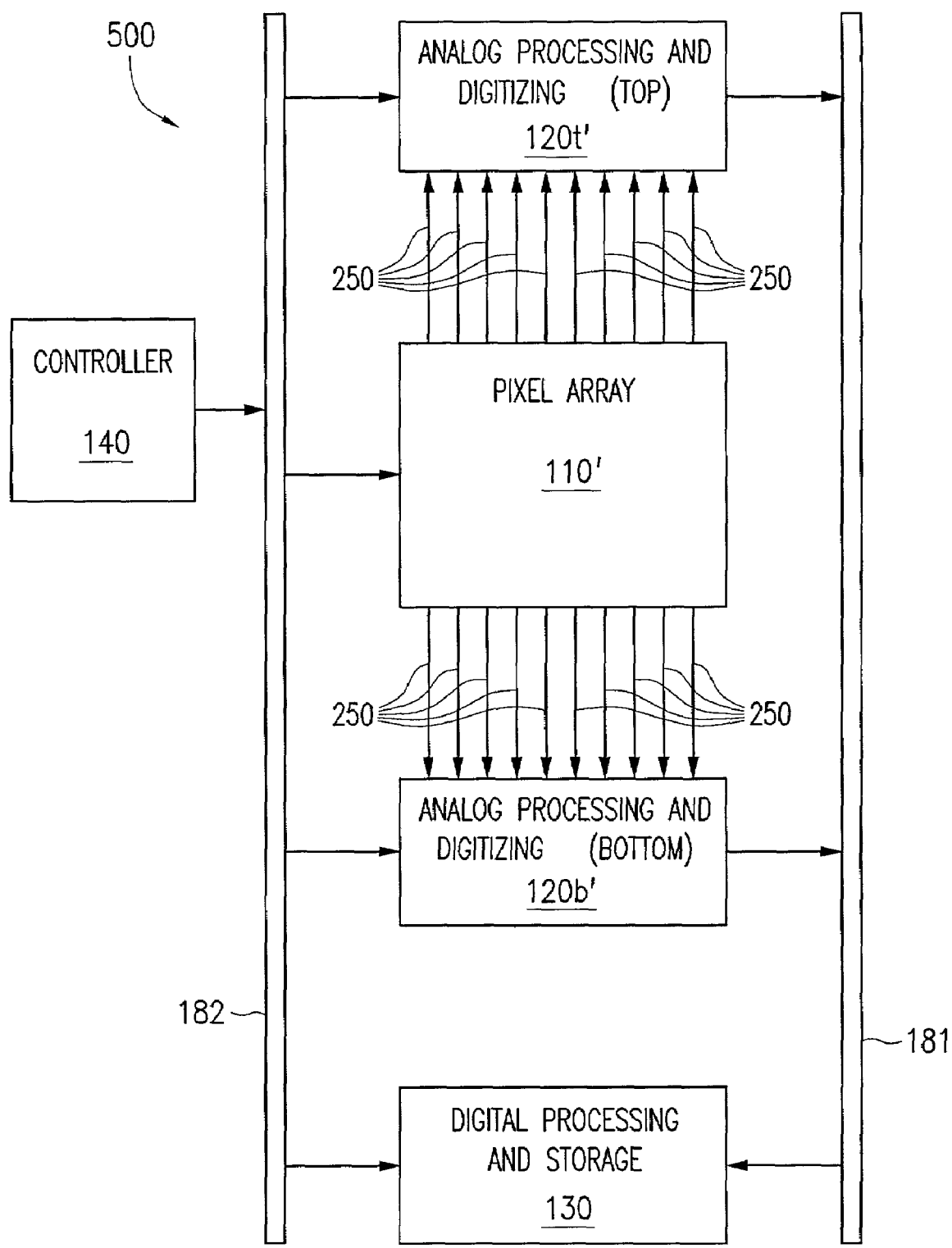
FIG. 5 is a block diagram of an image processing system according to the present invention.

Now referring to the drawings, where like reference numerals designate like elements, there is shown in FIG. 5 an portion of an imaging system 500 incorporating the principles of the present invention. The imaging system includes a modified pixel array 110' which is coupled to a modified top and bottom analog processing and digitizing circuits 120a', 120b'. While the description of the invention uses terms such as "top" and "bottom" to designate separate circuits, skill artisans would realize that these separate circuits need not be physically located at the top and bottom of the pixel array, but can be located anywhere convenient on an imaging chip. The imaging system also includes a digital processing and storage system 130. As with imaging system 100 of FIG. 1, the pixels in the pixel array convert light into analog electrical signals which are digitized by the analog processing and digitizing circuits 120a', 120b' and further processed and stored in the digital domain by the digital processing and storage system 130.

In the illustrated embodiment, the analog processing and digitizing circuits 120a' 120b' are coupled to the digital processing and storage system via data bus 181. Similarly, a controller 140 is coupled to the analog processing and digitizing circuits 120a', 120b', the pixel array 110', and the digital processing and storage system 130 via a control bus 182. However, it should be recognized that control and data signals can be differently conveyed between the components of the imaging system 500. For example, instead of separate data and control buses, a single bus may be used to carry both data and control signals. Alternatively, control and/or data signals may be routed by point-to-point links as necessary, from circuit to circuit, or circuit to system.

Figure 6:
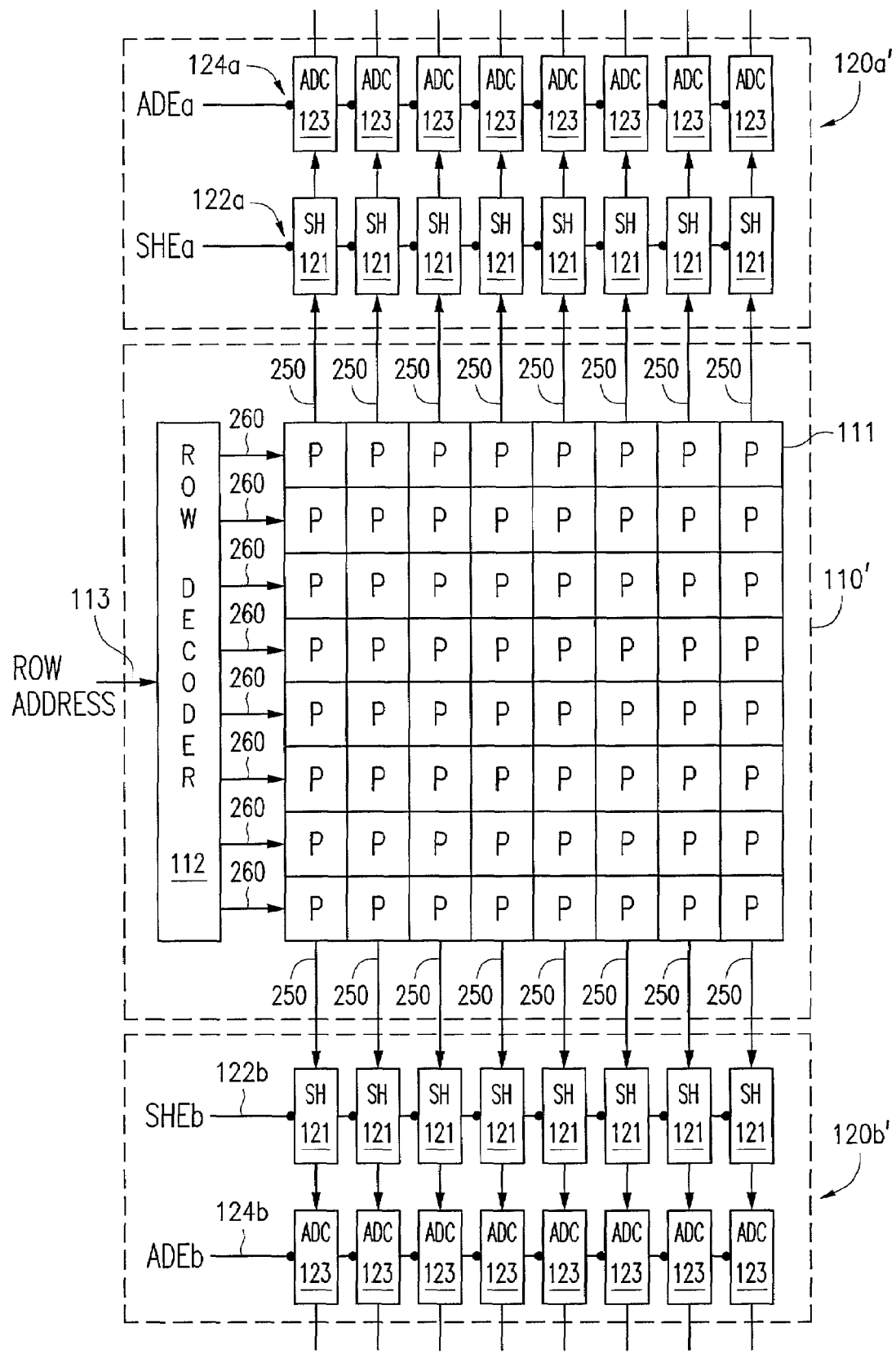
FIG. 6 is a block diagram of a pixel array and analog processing and digitization system in accordance with the principles of the present invention.

As shown in FIG. 6, each analog processing and digitizing circuit 120a', 120b' comprises a plurality of a sample-and-hold circuits 121 and a plurality of analog-to-digital converters 123. The sample-and-hold circuits 121 are each coupled to an output line 250 associated a respective columns of pixels. In the present invention, the sample-and-hold circuits 121 of both analog processing and digitizing circuits 120a', 120b' are coupled to both odd and even numbered columns of the array III. Each column also has a sample-and-hold circuit 121 at both the top (120a') and bottom (120b') of the column coupled to the column by a respective line 250. Each sample-and-hold circuit 121 is also coupled to signal line 122b (for circuit 120b') or 122a (for circuit 120a') for receiving control signals SHEa and SHEb, respectively. The state of control signals SHEa, SHEb determines when the sample-and-hold circuit 121 samples-and-holds its input signal.

Each sample-and-hold circuit 121 is associated with a corresponding analog-to-digital converter 123. Each analog-to-digital converter 123 accepts as its input, the signal output by the sample-and-hold circuit 121. Each analog-to-digital converter 123 accepts, on signal lines 124a (for circuit 120a) or 124b (for circuit 120b) control signals ADEa, ADEb, respectively, for determining when to perform the analog-to-digital conversion.

Figure 7:
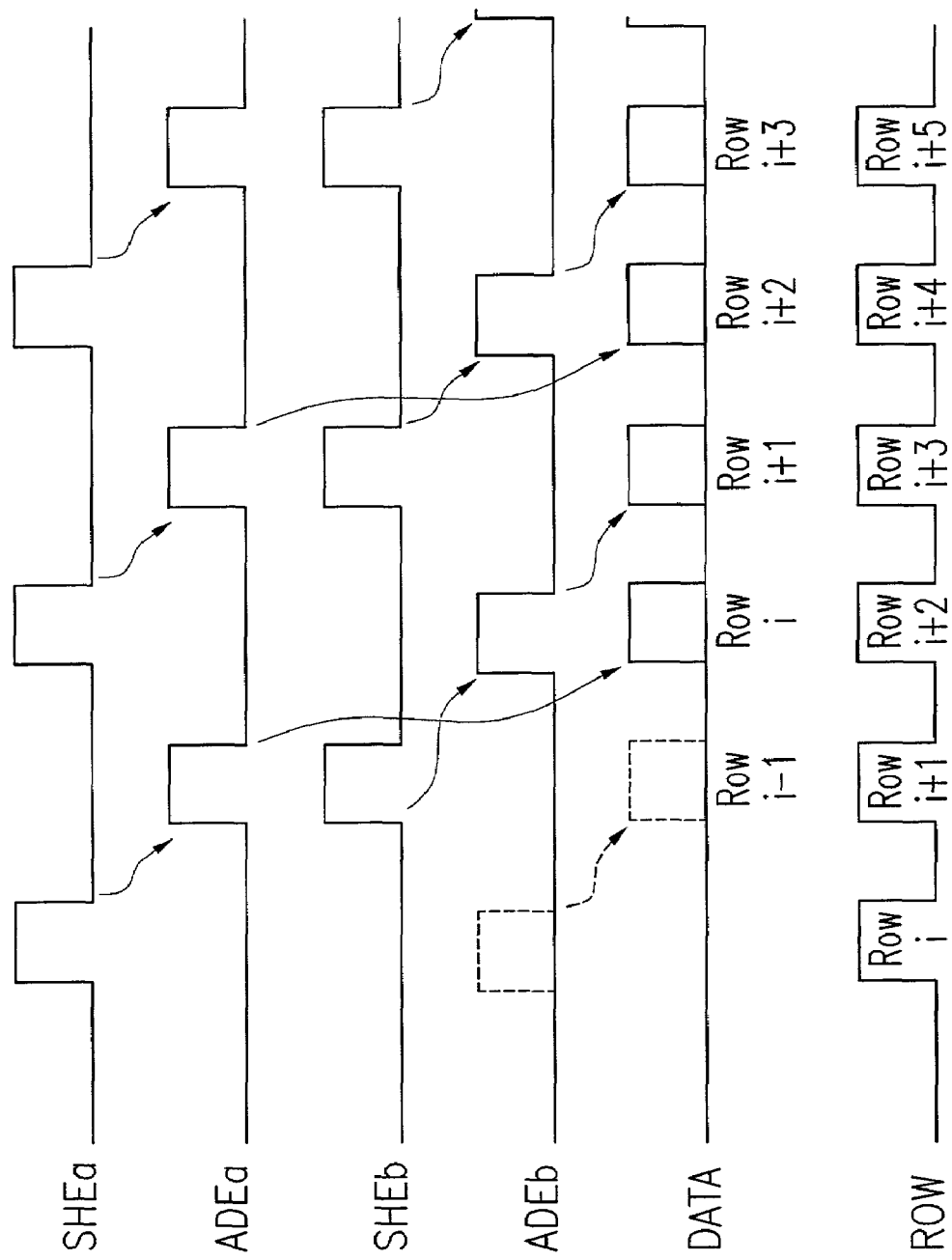
FIG. 7 is a timing diagram showing the operation of the apparatus illustrated in FIG. 5.

Referring again to FIG. 6 and to the timing diagram of FIG. 7, the operation of the modified pixel array 110' and modified analog processing and digitizing circuits 120a', 120b' can be explained. The process beings when the row decoder 112 decodes a row address previously supplied on signal line 112 and sets one of the signal lines 260 to a high logical state. The other signal lines 260 are also set to a low logical state. This is reflected in FIG. 6 by the ROW signal going high for "row i." As the ROW signal goes high, the output from pixels in the decoded row (i.e., row i) are coupled to the output lines 250. Additionally, the SHEa signal, which was low, is also driven high. The SHEb signal remains low. This enables the sample-and-hold circuits 121 in circuit 120a to sample-and-hold all the pixel signals of the decoded row.

The ROW signal then transitions back to a low logical state as the control circuit 140 sends a new row address to the row decoder 112. When the row decoder 112 finishes decoding the row address, it drives signal line 260 corresponding to the decoded row (i.e., row i+1) high and sets the other signal lines 260 to a low logical state. This is reflected in FIG. 7 by the row signal going high for "row i+1." As the ROW signal goes high for row i+1, the APEa and SHEb signals are driven high. The APEb and SHEa signals remain low. Driving APEa high causes the analog-to-digital converters 123 of circuit 120a' to convert the analog signal held in the sample-and-hold circuits 121 (of circuit 120a') to a digital signal. Driving SHEb high causes the sample-and-hold circuits 121 in circuit 120b to sample-and-hold all the pixel signals of row i+1.

The ROW signal then transitions back to a low logical state as the control circuit 140 sends another row address to the row decoder 112. When the row decoder 112 finishes the row decoding, it drives signal line 260 corresponding to the decoded row (i.e., row i+2) high and sets the other signals 260 to a low logical state. This is reflected in FIG. 7 by the row signal going high for "row i+2." As the ROW signal goes high for row i+2, the data converted by the digital-to-analog converters 123 of circuit 120a' are output. This is reflected by the row i block on the DATA line of FIG. 7. In addition to the data output, control signals SHEa and ADEb are both driven high. This causes the sample-and-hold circuits 121 of circuit 120a' to sample-and-hold the pixel signals from row i+2. This also causes the digital-to-analog converters 123 of circuit 120b' to perform their digital conversion.

The ROW signal then transitions back to a low logical state as the control circuit 140 sends another row to the row address decoder 112. When the row decoder 112 finishes the row decoding, it drives signal lines 260 as discussed above with respect to row i+3. Control signals APEa and SHEb are both driven high, thereby permitting the sampling-and-holding of row i+3 and the output of data corresponding to row i+1.

Note that the above description assumes that the process began with row i. In normal operation, the process should begin with the first row. If row i was not the first row, then when the ROW signal goes high for row i, signal ADEb will also be driven high, and when the ROW signal is again driven high for row i+1, the data corresponding to row i-1 will be available. In FIG. 7, the signals associated the above described events are shown as dotted lines.

The present invention therefore modifies the top and bottom analog processing and digitization circuits 120a', 120b' to become capable of receiving signals from both odd and even columns. Processing throughput is doubled by using one of the two circuits 120a' to sample-and-hold a row of pixels P while another circuit 120b' performs digitization on a previously sampled-and-held row. In this manner, at any given time one sample-and-hold circuit is active and one analog-to-digital conversion is also active. This pipelined approach requires the row decoder to operate twice as fast as before, but permits the data conversion at double speed.

Figure 8:
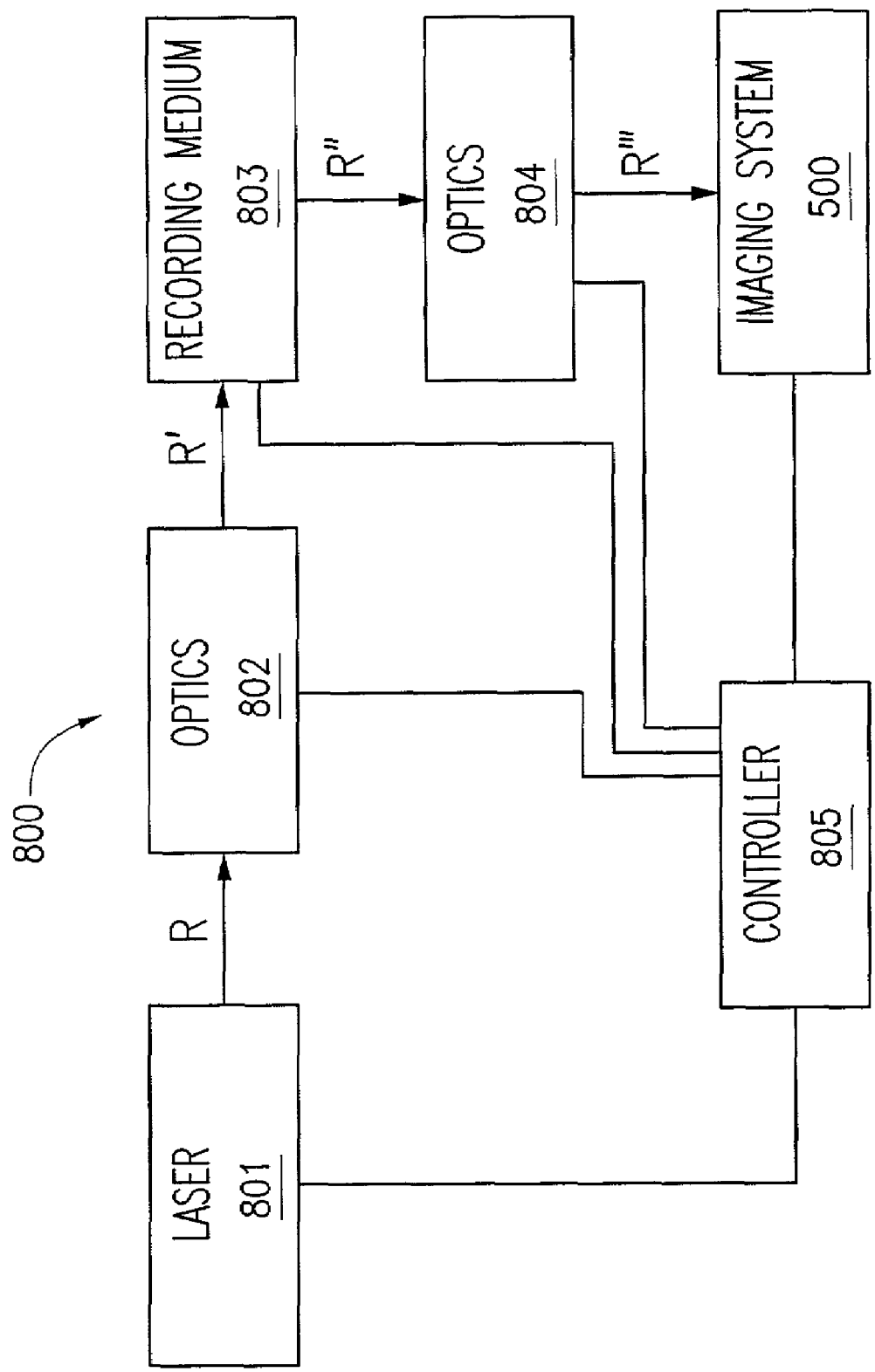
FIG. 8 is a detailed block diagram of a holographic storage device using the analog processing and digitization system in accordance with the principles of the present invention.

As previously noted, such high speed conversion may be utilized in a variety of applications, including, for example, reading a holographic memory system. FIG. 8 is an illustration of how the imaging system 500 of the present invention may be utilized with a holographic memory system 800. The holographic memory system 800 includes a laser 801 for generating a reference light beam R. The reference beam is focused using controllable optics path 802 to form a focused beam R', which illuminates a holographic recording medium 803. The holographic recording medium, in response to the focused beam R', diffracts the focused beam R' into a diffracted beam R'', which passes through a second controllable optics path 804 to produce beam R''', which is read by the imaging system 500 of the present invention. A controller 805 coordinates the operation of the laser 801, controllable optics 802, positioning of the holographic recording medium 803, operation of the second controllable optics 804, and the imaging system 500.

Figure 9:
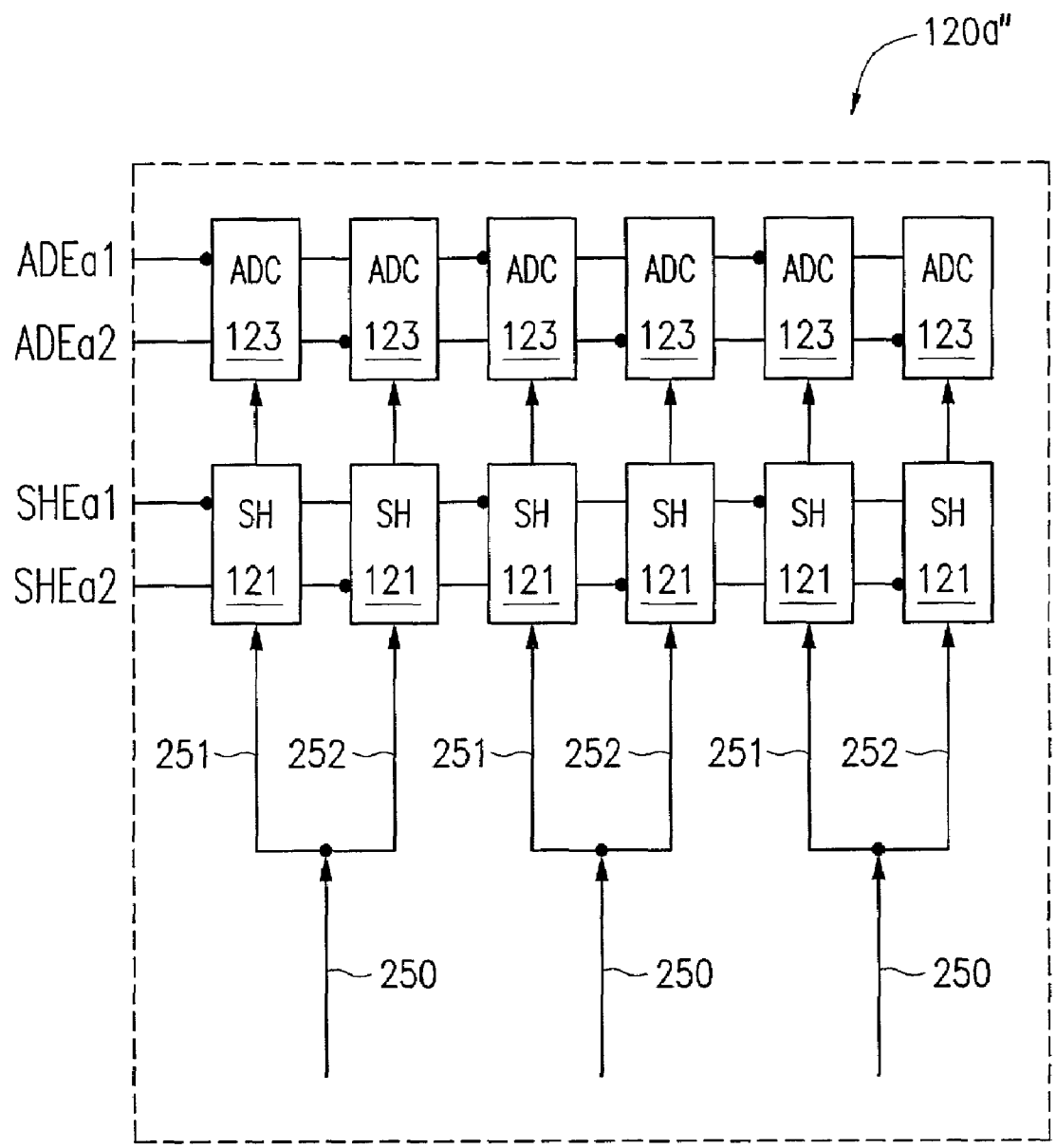
FIG. 9 is a detailed block diagram of an alternate embodiment in accordance with the principles of the present invention.

The principles of the present invention may be extended to create even faster imaging systems by modifying the analog processing and digitizing circuits 120a', 120b' through the use of additional analog-to-digital converters 123 and sample-and-hold circuits 121. For example, FIG. 9 is an illustration of a modified analog processing and digitizing circuit 120a''. The modified circuit 120a'', which is designed to be operated in combination with a similarly modified version of circuit 120b' (not illustrated) now utilizes double the number of sample-and-hold circuits 121 and double the number of analog-to-digital converters 123. The original circuits 121, 123 are respectively controlled by control signals SHEa1 and ADEa1 while the additional circuits 121, 123 are respectively controlled by control signals SHEa2 and ADEa2. The row decoder is operated at double speed and the two sets of circuits 121, 123 are operated in an interleaved fashion. In this manner, the speed of the imaging system may be doubled, or further increased (based on the degree of interleaving) by using additional sets of sample-and-hold circuits and analog-to-digital converters 123.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An imaging system, comprising:
a pixel array comprising a plurality of pixels arranged in rows and columns, the pixels in respective columns being selectively connected to a respective column output line of a plurality of column output lines;
a first digitization circuit, the first digitization circuit comprising a first plurality of first processing circuits, the first plurality of first processing circuits each comprising a respective sample-and-hold circuit and analog-to-digital converter; and
a second digitization circuit, the second digitization circuit comprising a second plurality of second processing circuits, the second plurality of second processing circuits each comprising a respective sample-and-hold circuit and analog-to-digital converter,
wherein each column output line is coupled to one of the first plurality of first processing circuits and to one of the second plurality of second processing circuits,
wherein each column output line provides pixel signals to at least one processing circuit in each of said first and second digitization circuits, and
wherein:
the first and second digitization circuits alternate receiving rows of pixels, and
the analog-to-digital converter of the first digitization circuit processes a first row of pixels at the same time as the sample-and-hold circuit of the second digitization circuit samples and holds pixel signals from a second row of pixels.

2. The imaging system of claim 1, wherein each of said sample-and-hold circuits of said first plurality of processing circuits comprises:
- a sample-and-hold circuit, comprising:
  - a first input coupled to a column output line of said column output lines,
  - a first output, and
  - a first enable line, coupled to said sample-and-hold circuit; and
- an analog-to-digital converter, comprising:
  - a second input, coupled to said first output,
  - a second output, and
  - a second enable line, coupled to said analog-to-digital converter.

3. The imaging system of claim 2, wherein each of said sample-and-hold circuits of said second plurality of second processing circuits comprises:
- a third input coupled to a column output line of said column output lines,
- a third output, and
- a third enable line, coupled to said sample-and-hold circuit; and an analog-to-digital converter, comprising:
- a fourth input, coupled to said third output,
- a fourth output, and
- a fourth enable line, coupled to said analog-to-digital converter.

4. The imaging system of claim 3, wherein said first plurality is equal in number to said second plurality.

5. The imaging system of claim 3, wherein said first and fourth enable lines carry a common first control signal.

6. The imaging system of claim 5, wherein said second and third enable lines carry a common second control signal.

7. The imaging system of claim 3, wherein said first digitization circuit further comprises:
- a third plurality of third processing circuits, respectively coupled to said column output lines, each of said third plurality of third processing circuits further comprising:
  - a sample-and-hold circuit, comprising:
    - a fifth input coupled to a respective column output line of said column output lines,
    - a fifth output, and
    - a fifth enable line, coupled to said sample-and-hold circuit,
  - wherein said analog-to-digital converter of the first digitization circuit comprises:
    - a sixth input, coupled to said fifth output,
    - a sixth output, and
    - a sixth enable line, coupled to said analog-to-digital converter.

8. The imaging system of claim 7, wherein said second digitization circuit further comprises:
- a fourth plurality of fourth processing circuits, respectively coupled to said column output lines, each of said fourth plurality of fourth processing circuit further comprising:
  - a sample-and-hold circuit, comprising:
    - a seventh input coupled to a respective column output line of said column output lines,
    - a seventh output, and
    - and a seventh enable line, coupled to said sample-and-hold circuit,
  - wherein said analog-to-digital converter of the second digitization circuit comprises:
    - a eighth input, coupled to said seventh output,
    - a eighth output, and
    - a eighth enable line, coupled to said analog-to-digital converter.

9. The imaging system of claim 8, wherein said third plurality is equal in number to said first plurality.

10. The imaging system of claim 8, wherein said third plurality is equal to said fourth plurality.

11. A holographic memory system, comprising:
- a laser, for producing a reference beam;
- a holographic medium;
- a first optical system, disposed between said laser and said holographic medium;
- an imaging system; and
- a second optical system, disposed between said holographic medium and the imaging system, along a diffracted beam produced by said holographic medium from said reference beam;
- wherein said imaging system further comprises:
  - a pixel array comprising a plurality of pixels arranged in rows and columns, the pixels in respective columns being selectively connected to a respective column output line of a plurality of column output lines;
  - a first digitization circuit, the first digitization circuit comprising a first plurality of first processing circuits, the first plurality of first processing circuits each comprising a respective sample-and-hold circuit and analog-to-digital converter; and
  - a second digitization circuit, the second digitization circuit comprising a second plurality of second processing circuits, the second plurality of second processing circuits each comprising a respective sample-and-hold circuit and analog-to-digital converter,
  - wherein each column output line is coupled to one of the first plurality of first processing circuits and to one of the second plurality of second processing circuits,
  - wherein each column output line provides pixel signals to at least one processing circuit in each of said first and second digitization circuits, and
  - wherein:
    - the first and second digitization circuits alternate receiving rows of pixels, and
    - the analog-to-digital converter of the first digitization circuit processes a first row of pixels at the same time as the sample-and-hold circuit of the second digitization circuit samples and holds pixel signals from a second row of pixels.

12. The imaging system of claim 11, wherein each of said sample-and-hold circuits of said first plurality of processing circuit comprises:
- a first input coupled to a respective column output line of said column output lines,
- a first output, and
- a first enable line, coupled to said sample-and-hold circuit; and
- an analog-to-digital converter, comprising:
  - a second input, coupled to said first output,
  - a second output, and
  - a second enable line, coupled to said analog-to-digital converter.

13. The imaging system of claim 12, wherein each of said sample-and-hold circuits of said second plurality of second processing circuit comprises:
- a third input coupled to a respective one column output line of said column output lines,
- a third output, and
- a third enable line, coupled to said sample-and-hold circuit; and
- an analog-to-digital converter, comprising:
  - a fourth input, coupled to said third output,
  - a fourth output, and a fourth enable line, coupled to said analog-to-digital converter.

14. The imaging system of claim 13, wherein said first plurality is equal in number to said second plurality.

15. The imaging system of claim 13, wherein said first and fourth enable lines carry a common first control signal.

16. The imaging system of claim 15, wherein said second and third enable lines carry a common second control signal.

17. The imaging system of claim 13, wherein said first digitization circuit further comprises:
a third plurality of third processing circuits, respectively coupled to said column output lines, each of said third plurality of third processing circuit further comprising:
a sample-and-hold circuit, comprising:
a fifth input coupled to a respective column output line of said column output lines,
a fifth output, and
a fifth enable line, coupled to said sample-and-hold circuit,
wherein said analog-to-digital converter of the first digitization circuit comprises:
a sixth input, coupled to said fifth output,
a sixth output, and
a sixth enable line, coupled to said analog-to-digital converter.

18. The imaging system of claim 17, wherein said second digitization circuit further comprises:
a fourth plurality of fourth processing circuits, respectively coupled to said column output lines, each of said fourth plurality of fourth processing circuit further comprising:
a sample-and-hold circuit, comprising:
a seventh input coupled to a respective column output line of said column output lines,
a seventh output, and
a seventh enable line, coupled to said sample-and-hold circuit
wherein said analog-to-digital converter of the second digitization circuit comprises:
a eighth input, coupled to said seventh output,
a eighth output, and
a eighth enable line, coupled to said analog-to-digital converter.

19. The imaging system of claim 18, wherein said third plurality is equal to said first plurality.

20. The imaging system of claim 18, wherein said third plurality is equal to said fourth plurality.

21. An imaging system, comprising:
a pixel array comprising a plurality of pixels arranged in rows and columns, the pixels in respective columns being selectively connected to a respective column output line of a plurality of column output lines;
a first plurality of first pixel signal processing circuits; and
a second plurality of second pixel signal processing circuits,
wherein each column output line is coupled to one of the first plurality of first processing circuits and to one of the second plurality of second processing circuits, and
wherein signals from pixels in one row of a column are processed by a first pixel signal processing circuit, at the same time as pixel signals in an adjacent row are processed by a second pixel signal processing circuit, such that pixel signals from pixels in successive adjacent rows of the column are alternately processed by a first and second pixel signal processing circuit.

22. The imaging system of claim 21, wherein each of said first plurality of first pixel signal processing circuits comprises a sample-and-hold circuit.

23. The imaging system of claim 21, wherein each of said first plurality of second pixel signal processing circuits comprises an analog-to-digital converter.

24. The imaging system of claim 21, wherein said first plurality is equal in number to said second plurality.

* * * * *